United States Patent
Wilks et al.

(10) Patent No.: US 7,353,980 B2
(45) Date of Patent: Apr. 8, 2008

(54) PROCESS FOR PRODUCING ALUMINUM-CONTAINING HONEYCOMB BODIES USING RADIANT HEATERS

(75) Inventors: Simone Wilks, Bonn (DE); Arndt-Udo Rolle, Siegburg (DE)

(73) Assignee: Emitec Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 11/384,628

(22) Filed: Mar. 20, 2006

(65) Prior Publication Data

US 2006/0186176 A1   Aug. 24, 2006

Related U.S. Application Data

(63) Continuation of application No. PCT/EP2004/010453, filed on Sep. 17, 2004.

(30) Foreign Application Priority Data

Sep. 19, 2003 (DE) .................. 103 43 463

(51) Int. Cl.
  B23K 31/02     (2006.01)
(52) U.S. Cl. .................. 228/157; 228/181; 228/233.2; 228/262.51
(58) Field of Classification Search ........... 228/181, 228/182, 157, 262.1, 262.5, 262.51; 392/407, 392/419, 420, 422
See application file for complete search history.

(56) References Cited

U.S. PATENT DOCUMENTS

| 3,416,218 | A | 12/1968 | Armenoff et al. |
| 6,599,645 | B2* | 7/2003 | Wittebrood .................. 428/654 |
| 6,761,857 | B1* | 7/2004 | Takahashi et al. ........... 422/180 |
| 2004/0139607 | A1* | 7/2004 | Bruck et al. ................... 29/890 |
| 2005/0191220 | A1* | 9/2005 | Bruck et al. ................. 422/189 |

FOREIGN PATENT DOCUMENTS

| WO | WO 02/081137 A2 | 10/2002 |
| WO | WO 3055631 A1 * | 7/2003 |
| WO | WO 2004018098 A1 * | 3/2004 |

OTHER PUBLICATIONS

WO 02/081137 A2 (Bruck, et al.) Oct. 17, 2002 (English translation), translated by FLS, Inc.*

* cited by examiner

*Primary Examiner*—Kiley Stoner
(74) *Attorney, Agent, or Firm*—Laurence A. Greenberg; Werner H. Stemer; Ralph E. Locher

(57) ABSTRACT

A method for producing aluminum-containing honeycomb bodies includes providing at least partly structured aluminum-based metal foils. The at least partly structured metal foils are stacked and/or wound to form a honeycomb structure having passages. The metal foils are heated from an open end face of the passages with at least one radiant heater. The honeycomb structure is heated in at least one subregion in such a way that the at least one subregion has a temperature between approximately 450° C. and approximately 600° C. after approximately 2 seconds to approximately 30 seconds. The metal foils are connected together in the at least one subregion by technical joining.

22 Claims, 2 Drawing Sheets

PROCESS FOR PRODUCING ALUMINUM-CONTAINING HONEYCOMB BODIES USING RADIANT HEATERS

CROSS-REFERENCE TO RELATED APPLICATION

This is a continuing application, under 35 U.S.C. § 120, of International Application No. PCT/EP 2004/010453, filed Sep. 17, 2004, which designated the United States; this application also claims the priority, under 35 U.S.C. § 119, of German Patent Application 103 43 463.1, filed Sep. 19, 2003; the prior applications are herewith incorporated by reference in their entirety.

BACKGROUND OF THE INVENTION

FIELD OF THE INVENTION

The present invention relates to a process for producing aluminum-containing honeycomb bodies, in which at least partially structured metal foils are stacked and/or wound to form a honeycomb structure with passages running approximately parallel to an axis. The metal foils are at least partially introduced into a tubular casing and are connected to one another by technical joining at least in subregions. Such metallic honeycomb bodies are used, for example, as catalyst carrier bodies for the purification of an exhaust gas from an internal combustion engine.

Known honeycomb bodies, in particular metallic catalyst carrier bodies, have a honeycomb structure with, for example, thin-walled, smooth and/or corrugated sheet-metal foils which are wound helically or in an S-shape. The sheet-metal foils are connected to one another in a circularly cylindrical or oval-cylindrical tubular casing by technical joining, such as welding, brazing or soldering, sintering, adhesion bonding or the like.

In order to increase the stability of such a honeycomb body under fluctuating thermal stresses, it is already known for the sheet-metal foils of the honeycomb structure to be connected to one another by technical joining only in certain subregions, for example at the end sides, and if appropriate also to be connected to the tubular casing. Therefore, in the event of thermal stresses occurring, the tubular casing and honeycomb structure are able to expand unimpeded, with the result that fluctuating plastic deformations of the honeycomb structure, leading to destruction and detachment of the honeycomb structure, are avoided.

Furthermore, processes for the end-side connection of a honeycomb structure disposed in a tubular casing using technical joining are known, in which the connection by technical joining is carried out in a discontinuous process that lasts for a number of hours in a high-temperature furnace. In that case, the individual honeycomb bodies are introduced into the furnace in batches. In order to avoid chemical reactions such as, for example, undesirable formation of crystals or oxidation, in particular at the surface of the sheet-metal foils, the joining process is carried out in the furnace under a shielding gas atmosphere containing, for example, argon and/or hydrogen or in vacuo. That in particular leads to a relatively high outlay for apparatus, with correspondingly high costs.

Furthermore, continuous processes are known which use induction coils to produce a connection between the sheet-metal foils by technical joining. The induction coils are used to heat at least subregions, in which a connection of the sheet-metal foils by technical joining is ultimately to be produced. Therefore, for example, a brazing material disposed in the subregions begins to flow and, after cooling, generates a connection of that type. Depending on the form of the connection by technical joining, the induction coils have to be operated with different AC voltage frequencies and have to be moved relatively close to the corresponding subregions of the honeycomb body. Such voltage frequencies and movements can lead to an uneven formation of connections by technical joining in the respective subregions.

SUMMARY OF THE INVENTION

It is accordingly an object of the invention to provide a process for producing aluminum-containing honeycomb bodies using radiant heaters, which overcomes the hereinafore-mentioned disadvantages of the heretofore-known methods of this general type, which allows processing of metal foils containing aluminum, which is suitable in particular for continuous production and which provides an improved quality of connections by technical joining.

With the foregoing and other objects in view there is provided, in accordance with the invention, a process for producing aluminum-containing honeycomb bodies. The process comprises providing at least partially structured metal foils based on aluminum. The at least partially structured metal foils are stacked and/or wound to form a honeycomb structure with passages having an open end face. The metal foils are heated with at least one radiant heater from the open end face of the passages, to heat the honeycomb structure, at least in a subregion, and cause the at least one subregion, after approximately 2 seconds to approximately 30 seconds, to have a temperature of approximately 450° C. to approximately 600° C. The metal foils are connected to one another by technical joining in the at least one subregion.

In the text which follows, a metal foil based on aluminum is to be understood as meaning a metal foil which contains at least 90% by weight of aluminum. The aluminum content is advantageously on average at least approximately 95% by weight or even at least approximately 99% by weight. Under certain circumstances, it may even be necessary to select metal foils with an even higher aluminum content, for example more than 99.9% by weight of aluminum. Unless specifically stated otherwise, in the text which follows, the term "metal foil" is always used to refer to an aluminum-containing metal foil of this type.

In addition, the metal foil may include at least one of the following chemical components: manganese (Mn), silicon (Si), magnesium (Mg), copper (Cu), titanium (Ti) and iron (Fe). By way of example, the following metal foils can be used: AA3005 (Al Mn 1 Mg 0.5); AA3003 (Al Mn 1 Cu); AA3103 (Al Mn 1); and AA 8001 (Al Fe Si).

Surprisingly, tests have shown that relatively high heating rates can be achieved with honeycomb bodies of this type. For example, it is possible, using suitable heat sources as described below, for the metal foils to be heated to the desired temperature within just two seconds. In this way it is possible to achieve extremely short production cycles. If, for example, the configuration of the contact zones between the metal foils or with a tubular casing surrounding them is not completely uniform, it may also be necessary to perform slightly slower heating, so that the desired temperature range is only reached after 15 to 30 seconds. Furthermore, only certain conditions should be used, since increased oxidation of the surface of the metal foils is then observed, making further uniform introduction of heat considerably more difficult.

According to the invention, the temperature is approximately between 450° C. and 600° C. In this context, the particular brazing material which is used, if appropriate, to form a connection by technical joining between the metal foils, is of crucial importance. If, for example, a zinc-based brazing material is used, under certain circumstances temperatures of only approximately 450° C. to approximately 530° C. will be sufficient, in which case shorter heat-up times are preferably also required. However, if the metal foils are connected to one another for example using a brazing material based on aluminum/silicon, temperatures from approximately 560° C. to approximately 600° C. need to be set, in which case longer heating times may need to be used. In particular, in the case of the latter brazing materials, it is accordingly necessary to carry out heating up to temperatures which are only just below the melting point of the metal foil itself. In particular, the temperatures are in a range which is less than 70° C., in particular less than 50° C. or even less than 30° C. below the melting point of the metal foils which are to be connected to one another.

Due to the short heat-up time to these high temperatures and a targeted heating of predeterminable subregions, the result is a very efficient and energy-saving method. This also has the advantage that the proposed process is suitable in particular for the series production or mass production of metallic honeycomb bodies.

In accordance with another mode of the invention, radiant heaters which generate a targeted infrared heating radiation are used to heat the honeycomb structure, generating a clear temperature drop in the vicinity of the outside of the at least one subregion. The spatially very tightly restricted introduction of heat due to the substantially parallel infrared heating radiation leads to a very uniformly distributed thermal energy and therefore to very uniform formation of connections within the heated subregions. Consequently, the process according to the invention produces metallic honeycomb bodies which have high-quality connections between the metal foils formed by technical joining, with this heating process being of only a short duration.

In accordance with a further mode of the invention, the honeycomb structure has passages running approximately parallel to an axis. The heating radiation is directed onto an end side of the honeycomb structure in such a manner that the honeycomb structure is heated only in subregions with an axial depth which is less than the axial length of the passages. This allows the production of honeycomb bodies having metal foils which are, for example, connected to one another only in the vicinity of the end side, with in particular a thermally induced compensating expansion of the metal foils with respect to one another being ensured. In this context, the term end side is to be understood as meaning the surface in which the end faces of the passages are substantially disposed.

In accordance with an added mode of the invention, the metal foils, prior to heating, are at least partially introduced into a tubular casing, are connected to one another by technical joining, and are then completely inserted into the tubular casing, and a number of the metal foils are connected to the tubular casing by technical joining. In this case it is possible, for example, to use different radiant heaters, in which case, at least during the connection of the metal foils to one another, a relatively homogenous distribution of the heat capacity in the subregions is ensured. Therefore, a radiant heater with a somewhat lower energy can be used for this connection than subsequently during the generation of the connection between tubular casing and honeycomb structure.

In accordance with an additional mode of the invention, prior to the heating, the metal foils are completely introduced into the tubular casing, with the tubular casing preferably projecting beyond the end sides of the honeycomb structure. This has the advantage that, after the connections by technical joining have been formed, the metal foils no longer have to be moved relative to the tubular casing.

In accordance with yet another mode of the invention, the metal foils, prior to heating, are disposed on the outside of an inner tube, in such a way that the metal foils form passages running substantially transversely to the inner tube, with a number of metal foils being connected to the inner tube by technical joining. Therefore, the invention also provides, for example, a process for producing honeycomb bodies through which fluid can flow in a radial direction, in which process the inner tube in particular has openings, through which the inner tube, which has an incoming flow centrally, allows a gas to flow out into the radially outwardly directed passages, or vice versa.

In accordance with yet a further mode of the invention, adjacent sections of the tubular casing or the inner tube are heated simultaneously, if appropriate with the aid of inductively acting heating. In this way it is also possible to produce a connection by technical joining between a number of metal foils and the tubular casing or the inner tube, with the result that the production of connections by technical joining both between the metal foils and from metal foils to the tubular casing or inner tube is carried out in one process step, thereby in particular reducing the manufacturing time. In this context, however, it should be taken into account that the heat-up times required to reach a defined temperature may have to be lengthened if the tubular casing or inner tube is also to be heated. This is caused in particular by the different heat capacities of the metal foils and the tubular casing or inner tube.

In accordance with yet an added mode of the invention, the at least one end side of the honeycomb structure is completely heated to a predeterminable depth. This leads to complete end-side connection of metal foils, preventing, for example, ends of the metal foils disposed at the end side from being made to vibrate due to pressure fluctuations occurring in an exhaust-gas stream, since such vibrations could cause adjacent connections formed by technical joining to become detached due to mechanical fatigue stresses. Accordingly, the formation of connections between the metal foils by technical joining over the entire end side of the honeycomb structure, for example, increases the service life of a honeycomb body used as a catalyst carrier body in an exhaust system.

In accordance with yet an additional mode of the invention, the honeycomb structure has passages running approximately parallel to an axis, and the depth of the heated subregions is varied, with heating preferably being carried out to a greater depth in subregions of the honeycomb structure which are disposed radially outward than in subregions which are disposed radially inward. With regard to a configuration of a honeycomb body through which there can be a flow in the radial direction, of course, a correspondingly varying depth in the axial direction and/or circumferential direction of the honeycomb body is also possible. In this way it is possible, for example, to achieve a more stable connection between the honeycomb body and the tubular casing or inner tube than the connections between the metal foils formed by technical joining.

In accordance with still another mode of the invention, the heating radiation impinges on the at least one end side of the honeycomb structure at an angle of between 10° and 80°. The angle selected in this case has effects on the depth up to which the honeycomb structure is heated. At angles of less than 10°, the heating radiation extends over a relatively large subregion of the end side, with the result that the thermal energy generated by the radiant heater is distributed over larger subregions, thereby reducing the introduction of energy per unit area and slowing the heating process. Angles of greater than 80° should likewise be avoided, since in that case a large proportion of the heating radiation or thermal energy passes directly through the honeycomb structure and cannot be used to heat the metal foils. Furthermore, the external shape of the end side should be taken into account when selecting the angle. If this includes, for example, a telescopic configuration of metal foils, in which adjacent metal foils are disposed partially offset with respect to one another, by way of example relatively large or relatively small angles should be used depending on the type of telescopic configuration. However, if the end side is substantially planar, angles in a range from 30° to 60° are preferred.

In accordance with still a further mode of the invention, the honeycomb body is moved relative to the at least one radiant heater during the heating operation, with the result that, with the aid of a radiant heater which emits a spatially limited heating radiation, if appropriate even large subregions of the honeycomb structure, in particular the entire end side of the honeycomb structure, are heated. According to a process variant, it is proposed to execute a rotational relative movement of the at least one radiant heater about the axis of the honeycomb body, thereby likewise ensuring a large-area and uniform heating of the honeycomb structure.

In accordance with still an added mode of the invention, the relative movement between the honeycomb body and the at least one radiant heater is generated by the honeycomb body rotating about its axis and/or the angle between the radiation axis of the at least one radiant heater and the axis of the honeycomb body being varied. This ensures that the heating radiation penetrates down to the desired depth of the honeycomb structure irrespective of whether the subregions to be heated are located close to a projecting tubular casing or in centrally disposed subregions of the end side.

In accordance with still an additional mode of the invention, the connections by technical joining are produced by brazing or soldering, sintering and/or diffusion welding. In this case it is particularly advantageous for brazing material, diffusion promoter or the like to be disposed in the subregions prior to the heating used to form the connections by technical joining. It is preferable for the connections produced by technical joining to be formed by brazing, in which case brazing material is disposed in the subregions prior to the heating operation. As a result, the temperatures which are required to form the connection produced by technical joining are kept at a relatively low level, so that relatively short cycle times for the formation of the connections can be maintained.

In accordance with a concomitant mode of the invention, if particularly high temperatures (in particular higher than 550° C.) occur during the production of the connection by technical joining, it is advantageous for these connections to be produced under shielding gas. Known shielding gases, in particular with an argon content, are suitable for this purpose.

In the text which follows, the process according to the invention is described in more detail in conjunction with an apparatus which is suitable for carrying out the process.

The apparatus for producing metallic honeycomb bodies, in particular for carrying out the process according to the invention, includes a positioning surface for positioning a honeycomb body during a heating operation, and at least one radiant heater with a radiation axis. The apparatus is distinguished by the fact that the positioning surface and the radiation axis of the radiant heater include an angle of from 10° to 80°. In this case, the radiant heater is in particular configured in such a way that it radiates at an angle of 10° to 80° with respect to the end side of a honeycomb body fixed on the positioning surface. The radiant heater allows rapid heating of subregions of the honeycomb body to form connections produced by technical joining.

In order to ensure that subregions of the honeycomb body are heated as uniformly as possible, the positioning surface is preferably pivotable, so that the angle is adjustable, in particular even during the heating operation. This can also be achieved by a further configuration of the apparatus in which the at least one infrared radiant heater is pivotable.

In the apparatus, the distance between the positioning surface and the at least one infrared radiant heater can be varied. In this context it is particularly advantageous for the at least one infrared radiant heater to be movable on predeterminable paths with respect to the positioning surface. In this way it is possible to ensure, for example, that the connections produced by technical joining are generated over a varying depth in different subregions of the heated end side. With a view toward superimposing a plurality of relative movements of the honeycomb body and the at least one infrared radiant heater, it is particularly advantageous for these movements to be adapted to one another, in particular by the individual movements being recorded by metrological measures and/or coordinated through the use of a common, preferably computer-controlled control unit.

The positioning surface also has, for example, a holder for fixing the honeycomb body. This ensures that a desired positioning of the honeycomb body with respect to the at least one infrared radiant heater is maintained. Holders of this type are important in particular if the positioning surface is part of an assembly line. An assembly line of this type allows the production of metallic honeycomb bodies in a continuous process, which is particularly suitable due to the short heat-up times of the honeycomb body effected through the use of the infrared radiant heaters.

Moreover, it is possible to provide mirrors for diverting or reflecting the heating radiation. This is to be understood in particular as meaning parts of the heating radiation which have already been reflected by the metal foils. Accordingly, the use of mirrors of this type leads to improved utilization of the heating radiation generated by the infrared radiant heaters. However, it is also possible for radiation to be radiated directly onto the mirrors and in this way diverted onto the subregions to be heated, in which case, for example, projections or shoulders projecting into the direct radiation axis in the vicinity of the end side of the honeycomb body can be "bypassed".

If the connections produced by technical joining are produced at very high temperatures, the apparatus has measures for generating a local shielding gas atmosphere, in particular a housing. In this case, the housing encloses at least sections close to the subregion of the honeycomb body which is heated with the aid of the infrared radiant heaters, in which case impeding of the direct heating radiation should be avoided.

Other features which are considered as characteristic for the invention are set forth in the appended claims.

Although the invention is illustrated and described herein as embodied in a process for producing aluminum-containing honeycomb bodies using radiant heaters, it is nevertheless not intended to be limited to the details shown.

Rather, various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
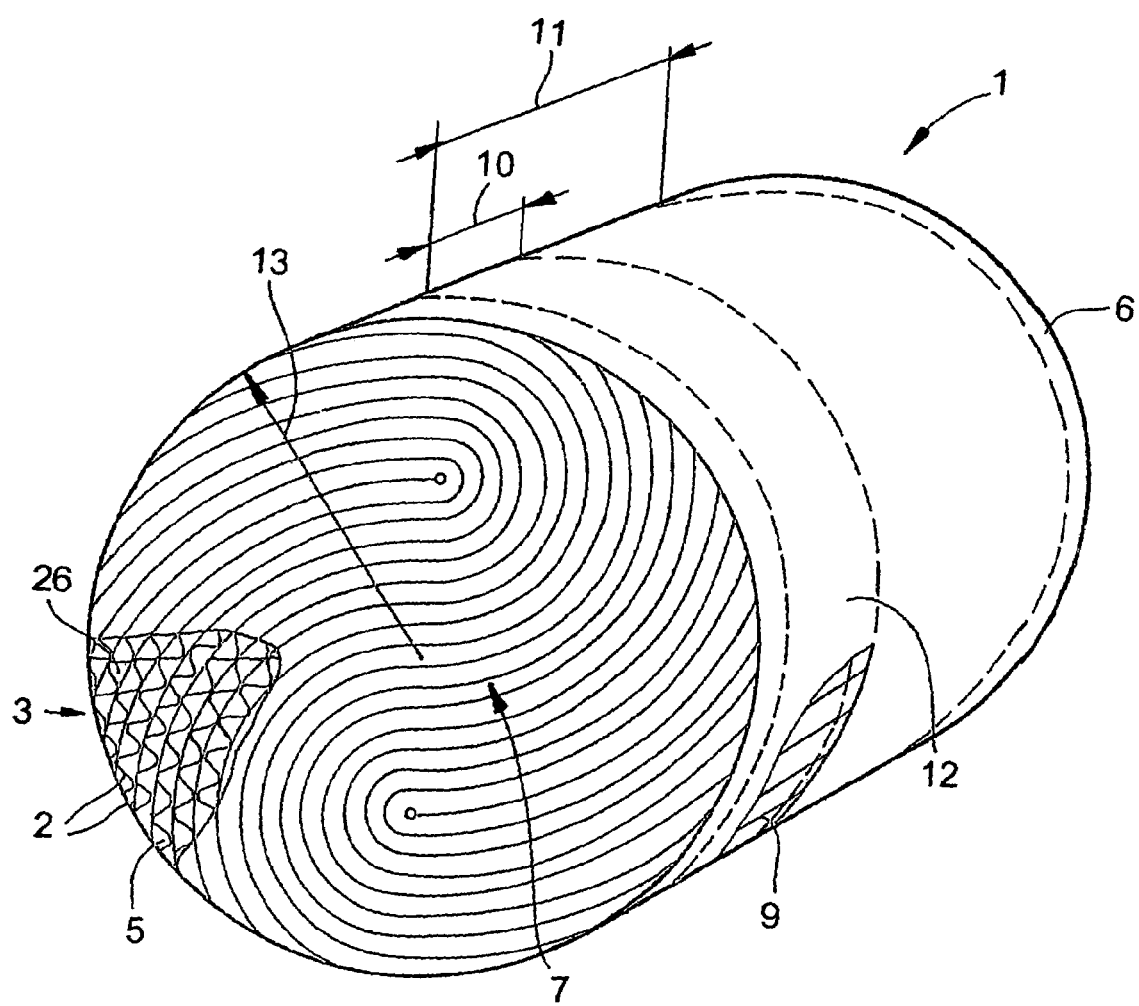
FIG. 1 is a diagrammatic, partly broken-away, perspective view of an embodiment of a honeycomb body which has been produced according to the invention.

Referring now to the figures of the drawings in detail and first, particularly, to FIG. 1 thereof, there is seen a diagrammatic and perspective illustration of an aluminum-containing honeycomb body 1 with stacked metal foils 2 which have been wound in an S shape. The honeycomb body 1 has passages 5 which are formed by using smooth and corrugated metal foils 2. The passages 5 and the metal foils 2 form a corresponding honeycomb structure 3. The honeycomb structure 3 is surrounded by a tubular casing 6 which projects beyond end sides 7 of the honeycomb body 1. Individual, open end faces 26 of the passages 5 in this case are disposed substantially in the planar end sides 7 of the honeycomb body 1.

The production of the illustrated aluminum-containing honeycomb body 1 includes, for example, the following steps:
  selecting at least partially structured metal foils 2 based on aluminum;
  stacking and winding the at least partially structured metal foils 2 in an S-shape to form a honeycomb structure 3 with passages 5 running approximately parallel to an axis 4 (shown in FIG. 2);
  completely introducing the metal foils 2 into a tubular casing 6, with the tubular casing projecting beyond end sides 7 of the honeycomb structure 3;
  completely heating an end side 7 of the honeycomb structure 3 with the aid of at least one radiant heater 8 (shown in FIGS. 2 and 3), with heating radiation being directed onto open end faces 26 of the passages 5, in such a manner that the honeycomb structure 3, in a subregion 9 with an axial depth 10 (shorter than an axial length 11 of the passages 5), is heated in such a way that this subregion 9 is at a temperature of approximately 450° C. to approximately 600° C. after only approximately 2 seconds to approximately 30 seconds; and
  connecting the metal foils 2 to one another and radially outer regions 13 of the metal foils 2 to the tubular casing 6 by technical joining, with the connection produced by technical joining being effected by brazing.

Figure 2:
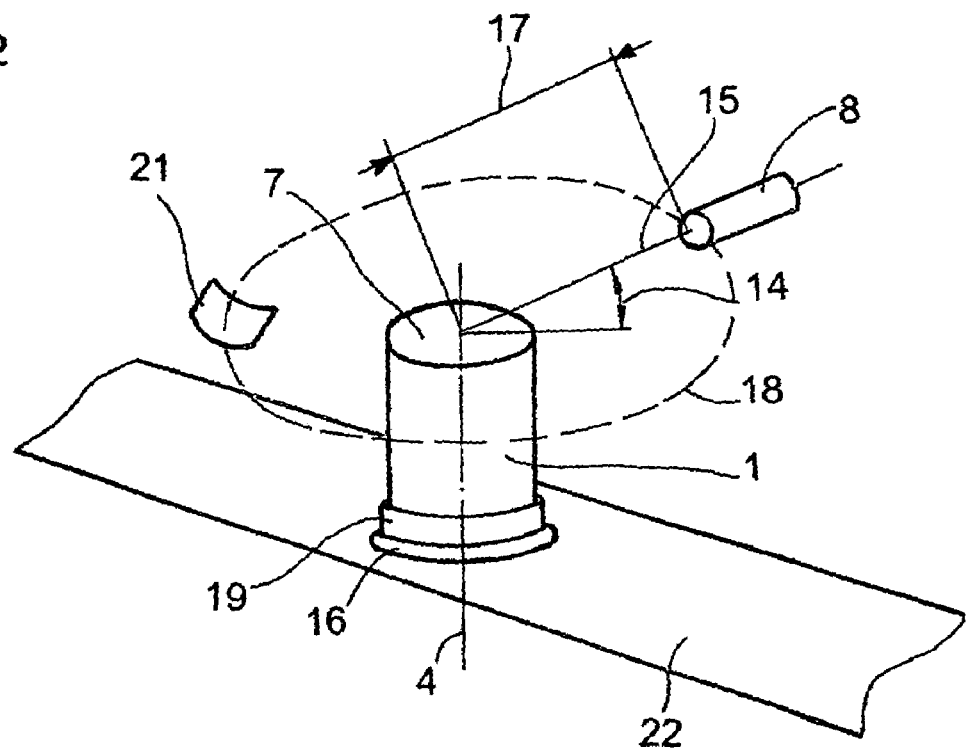
FIG. 2 is a fragmentary, perspective view of a first embodiment of a production apparatus.

FIG. 2 shows a diagrammatic and perspective illustration of a first embodiment of an apparatus for producing metallic, aluminum-containing honeycomb bodies 1. The apparatus has a positioning surface 16 for positioning a honeycomb body 1 during a heating operation and an infrared radiant heater 8 with a radiation axis 15. The radiation axis 15 and the end side 7 of the honeycomb body 1, which is approximately parallel to the positioning surface 16, at least at times include an angle 14 of from 10° to 80°. In this case, the honeycomb body 1 is fixed through the use of a holder 19. A distance 17, from the infrared radiant heater 8 to a point at which the heating radiation impinges on the end side 7 of the honeycomb body 1, is to be selected in such a way as to ensure that the honeycomb structure 3 is heated to the predetermined depth 10 as quickly as possible.

In this context it is particularly advantageous for the infrared radiant heater 8 to be moved on a path 18 relative to the honeycomb body 1, preferably with the angle 14 being varied. The path 18 is illustrated in the shape of a circle, but in particular any desired path 18 can be generated by using a computer-controlled movement. The apparatus has a mirror 21, which throws any reflected heating radiation back onto the honeycomb structure 3, for improved utilization of the heating radiation. Since very rapid heating of subregions of the honeycomb body 1 is possible in this way, this type of formation of connections by technical joining is recommended for use as a continuous process. The positioning surface 16 in this case forms part of an assembly line 22.

Figure 3:
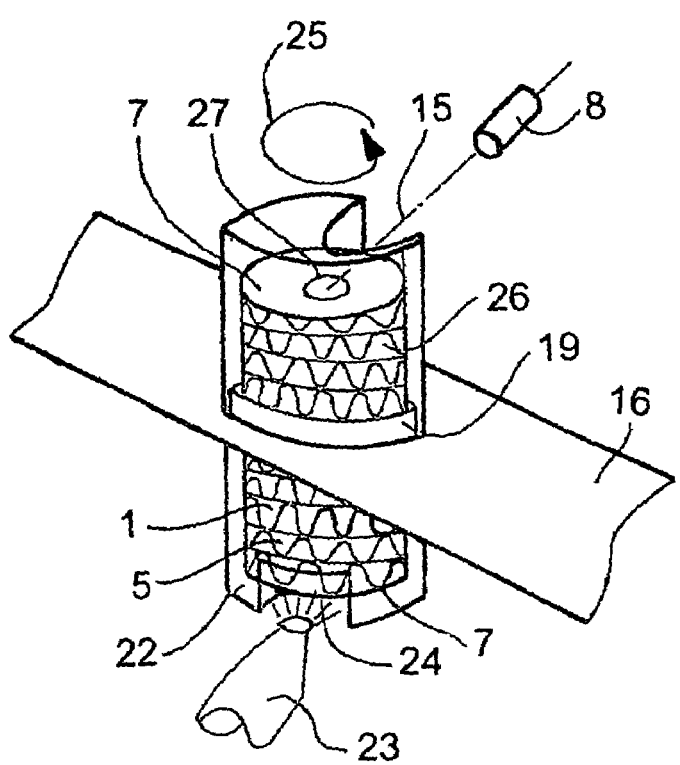
FIG. 3 is a fragmentary, perspective view of a second embodiment of a production apparatus.

FIG. 3 shows a second embodiment of an apparatus for producing a metallic honeycomb body 1 through which there can be a flow in the radial direction. The honeycomb body 1 in this case has a plurality of layers of structured and smooth metal foils 2, which form passages 5 running substantially transversely with respect to a centrally disposed inner tube 27, that is radially outward. The honeycomb body 1 is fixed relative to a positioning surface 16 using a holder 19, with the honeycomb body extending through the positioning surface 16. The honeycomb body 1 is surrounded by a housing 22, which serves in particular to form a shielding gas atmosphere in the interior. For this purpose, by way of example, argon-containing shielding gas is fed into the interior of the central inner tube 27 from an end side 7 of the honeycomb body 1 through the use of a nozzle 23, and emerges again from the open end faces 26 of the passages 5, causing the connections produced by technical joining to be formed in a shielding gas atmosphere using the infrared radiant heater 8. For this purpose, the housing has openings 24 which ensure unimpeded heating of the honeycomb structure 3 along the radiation axis 15. In this context, an arrow 25 indicates that the honeycomb body 1 rotates, for example during the heating operation, in which case the radiant heater 8 preferably radiates onto the end side 7 of the honeycomb body 1 at different angles 14 within a range of from 10° to 80°. Uniform heating and therefore also a high-quality connection by technical joining are ensured in this way. Furthermore, the illustrated embodiment offers the possibility of double-sided and simultaneous heating of both end sides 7 of the honeycomb body 1. The production times for an aluminum-containing honeycomb body 1 of this type could be further reduced in this way. It is also noted that sections 12 of the tubular casing 6 or of the inner tube 27 which adjoin the subregions 9 of the honeycomb structure 3 may be additionally heated inductively.

We claim:

1. A process for producing aluminum-containing honeycomb bodies, which process comprises the following steps:
providing at least partially structured metal foils based on aluminum;
at least one of stacking or winding the at least partially structured metal foils to form a honeycomb structure with passages having an open end face;
selecting a brazing material from the group consisting of zinc-based brazing material and aluminum/silicon-based brazing material;
on using a zinc-based brazing material, heating the metal foils with at least one radiant heater from the open end face of the passages, to heat the honeycomb structure, at least in a subregion, and cause the at least one subregion, after approximately 2 seconds to approximately 15 seconds, to have a temperature of approximately 450° C. to approximately 530° C.;
on using a aluminum/silicon-based brazing material, heating the metal foils with at least one radiant heater from the open end face of the passages, to heat the honeycomb structure, at least in a subregion, and cause the at least one subregion, after approximately 2 seconds to approximately 15 seconds, to have a temperature of approximately 560° C. to approximately 600° C.; and
connecting the metal foils to one another by technical joining in the at least one subregion.

2. The process according to claim 1, which further comprises carrying out the step of heating the honeycomb structure with radiant heaters by generating a targeted infrared heating radiation, to generate a clear temperature drop in a vicinity of an outside of the at least one subregion.

3. The process according to claim 1, which further comprises aligning the passages of the honeycomb structure approximately parallel to an axis, and directing the heating radiation onto an end side of the honeycomb structure for heating the honeycomb structure only in subregions with an axial depth less than an axial length of the passages.

4. The process according to claim 1, which further comprises at least partially introducing the metal foils, prior to heating, into a tubular casing, connecting the metal foils to one another by technical joining, then completely inserting the metal foils into the tubular casing, and connecting a number of the metal foils to the tubular casing by technical joining.

5. The process according to claim 4, which further comprises completely introducing the metal foils into the tubular casing.

6. The process according to claim 4, which further comprises completely introducing the metal foils into the tubular casing, with the tubular casing projecting beyond the end sides of the honeycomb structure.

7. The process according to claim 1, which further comprises placing the metal foils, prior to heating, on an outside of an inner tube, with the passages formed by the metal foils extending substantially transversely to the inner tube, and connecting a number of the metal foils to the inner tube by technical joining.

8. The process according to claim 4, which further comprises additionally inductively heating sections of the tubular casing adjoining the subregions of the honeycomb structure.

9. The process according to claim 7, which further comprises additionally inductively heating sections of the inner tube adjoining the subregions of the honeycomb structure.

10. The process according to claim 1, which further comprises completely heating at least one end side of the honeycomb structure to a predeterminable depth.

11. The process according to claim 1, which further comprises aligning the passages of the honeycomb structure approximately parallel to an axis, and varying a depth of the heated subregions.

12. The process according to claim 11, which further comprises carrying out the heating to a greater depth in subregions of the honeycomb structure disposed radially outward than in subregions disposed radially inward.

13. The process according to claim 1, which further comprises impinging on at least one end side of the honeycomb structure with heating radiation at an angle of between 10° and 80°.

14. The process according to claim 1, which further comprises moving the honeycomb structure and the at least one radiant heater relative to each other during the heating step.

15. The process according to claim 14, which further comprises carrying out the relative movement as a relative rotational movement of the at least one radiant heater about an axis of the honeycomb structure.

16. The process according to claim 15, which further comprises rotating the honeycomb structure about its axis.

17. The process according to claim 14, which further comprises varying an angle between a radiation axis of the at least one radiant heater and an axis of the honeycomb structure.

18. The process according to claim 1, which further comprises producing the technical joining connections by at least one method selected from the group consisting of brazing, sintering and diffusion welding.

19. The process according to claim 18, which further comprises placing brazing material or diffusion promoter in the subregions, prior to the heating to form the technical joining connections.

20. The process according to claim 1, which further comprises producing the technical joining connections under shielding gas.

21. The process according to claim 19, wherein the brazing material has a melting temperature less than a melting temperature of said foils.

22. The process according to claim 21, wherein the brazing material is zinc-based or is based on aluminum/silicon.

* * * * *